United States Patent [19]

Esaki

[11] Patent Number: 5,354,115
[45] Date of Patent: Oct. 11, 1994

[54] STRUCTURE OF SIDE BODIES OF AN AUTOMOTIVE VEHICLE

[75] Inventor: Toshikatsu Esaki, Hiroshima, Japan

[73] Assignee: Mazda Motor Corporation, Hiroshima, Japan

[21] Appl. No.: 24,452

[22] Filed: Mar. 1, 1993

[30] Foreign Application Priority Data

Feb. 28, 1992 [JP] Japan .............................. 4-018921[U]
Feb. 28, 1992 [JP] Japan .............................. 4-018922[U]

[51] Int. Cl.⁵ ............................................. B62D 23/00
[52] U.S. Cl. ................................... 296/203; 296/188; 296/204; 296/209
[58] Field of Search ............................... 296/187–189, 296/203, 204, 209

[56] References Cited

U.S. PATENT DOCUMENTS

| | | | |
|---|---|---|---|
| 4,875,733 | 10/1989 | Chado et al. | 296/195 |
| 5,018,780 | 5/1991 | Yoshii et al. | 296/203 |

FOREIGN PATENT DOCUMENTS

| | | | |
|---|---|---|---|
| 259577 | 12/1985 | Japan | 296/209 |
| 64587 | 4/1986 | Japan | 296/195 |
| 1-103483 | 7/1989 | Japan . | |
| 783098 | 11/1980 | U.S.S.R. | 296/204 |
| 1684151 | 10/1991 | U.S.S.R. | 296/195 |
| 927275 | 5/1963 | United Kingdom | 296/204 |
| 2080211 | 2/1982 | United Kingdom | 296/204 |

*Primary Examiner*—Dennis H. Pedder
*Attorney, Agent, or Firm*—Fish & Richardson

[57] ABSTRACT

A first closed sectional structure is formed with the pillar reinforcement disposed within the pillar section of the rear fender. A second closed sectional structure is formed with the aid of the side frame. Two third closed sectional structures are formed with the aid of the floor reinforcements and they are disposed in a spaced relationship apart in the longitudinal direction of the body. The second and third closed sectional structures are arranged in a region that is formed by extending the first closed sectional structure in the inner direction of the body.

23 Claims, 5 Drawing Sheets

STRUCTURE OF SIDE BODIES OF AN AUTOMOTIVE VEHICLE

BACKGROUND OF THE INVENTION

1. Field of the Invention

The present invention relates to a structure of side bodies of an automotive vehicle.

2. Description of the Related Art

In order to compete with a crash at the side body of an automotive vehicle, for example, Japanese Unexamined Utility Model Publication (kokai) No. 1-103,483 discloses a structure of the side body of the automotive vehicle, which comprises a side beam connecting a rear wheel housing with a center pillar, the side beam being disposed on the inner side of a rear fender outer panel, and a rear lateral beam disposed on the inner side of a spacer interposed between the side beam and a rear fender inner panel.

Recently, however, more effective and stronger structure of the side body of the automotive vehicle has been desired which can compete with a crash from the side body of the vehicle.

SUMMARY OF THE INVENTION

Therefore, the object of the present invention is to provide a structure of side bodies of an automotive vehicle adapted to improve the physical strength of the side body of a vehicle in a crash.

In order to achieve the aforesaid object, the present invention consists of a structure of side bodies of an automotive vehicle, having a side sill extending in a longitudinal direction of the body in a lower position at each of left and right side portions of the body, a floor panel connected at its left and right side end sections to the side sill, a rear fender connected at its lower end portion to the side sill, the rear fender comprising a rear fender inner panel and a rear fender outer panel, and a pillar section, comprising:

a first closed section formed by a pillar reinforcement and the rear fender inner panel, the pillar reinforcement being disposed in the rear fender for reinforcing the pillar section;

a second closed section formed by said side sill, a side frame, and the floor panel, the side frame being disposed in a position underneath the floor panel and adjacent to the side sill; and a third closed section formed by a floor reinforcement and the floor panel, the floor reinforcement being disposed in a position above the floor panel and above said second closed section;

wherein each of said second closed section and said third closed section is located in a region facing said first closed section and existing at an inside of the body, that is, in a region extending transversely from said first closed section toward the inside of the body.

This arrangement for the structure of the side bodies of the vehicle is adapted so that the first closed section receives a load from the side body of the vehicle during a side car crash and to then disperses the load through the first closed section into the closed sections of the side sill itself, that is, the second and third closed sections. Hence, the structure of the side bodies of the vehicle according to the present invention effectively improves the physical strength against the side car crash and prevents the pillar from curving or falling down into the inside of the body.

Other objects, features and advantages of the present invention will become apparent during the course of the description of the preferred embodiments, which follows, with reference to the accompanying drawings.

DETAILED DESCRIPTION OF THE INVENTION

The present invention will be described in more detail by way of examples with reference to the accompanying drawings.

Figure 8:
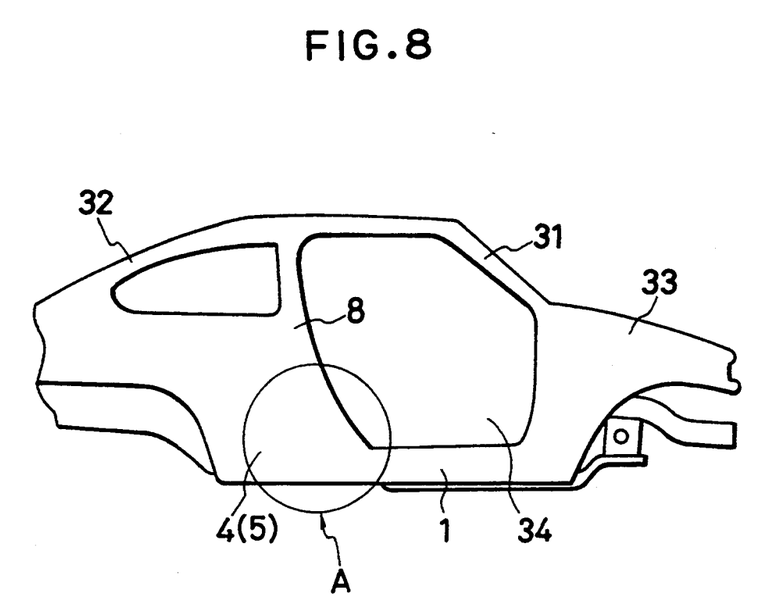
FIG. 8 is a side view showing the portions of the body of the vehicle, to which the present invention is applied.

As shown in FIG. 8, reference numeral 1 denotes a side sill, reference numeral 4 denotes a rear fender, and reference numeral 33 denotes a front fender which in turn has a center pillar 8. Reference numeral 31 denotes a front pillar, and reference numeral 32 denotes a rear pillar. Further, reference numeral 34 denotes a side opening through which a driver or a passenger gets on and off, and the side opening 34 is closed and opened with a side door (not shown). The lower end of the side opening 34 is defined and delimited with the side sill 1, and the rear end of the side opening 34 is defined and delimited with the center pillar 8 constituting the front end of the rear fender 4.

The present invention relates to a structure of a portion in the vicinity of an intersection among the side sill 1, the rear fender 4 (the center pillar 8), and the floor panel not shown in FIG. 8, that is, the portion as indicated by the arrow A in FIG. 8. The detailed description that follows is directed to the portion involved in the present invention. Further, a description is made of the left side body of the vehicle with reference to FIGS. 1 to 7 because the left side body of the vehicle are substantially the same as the right side body thereof.

Figure 1:
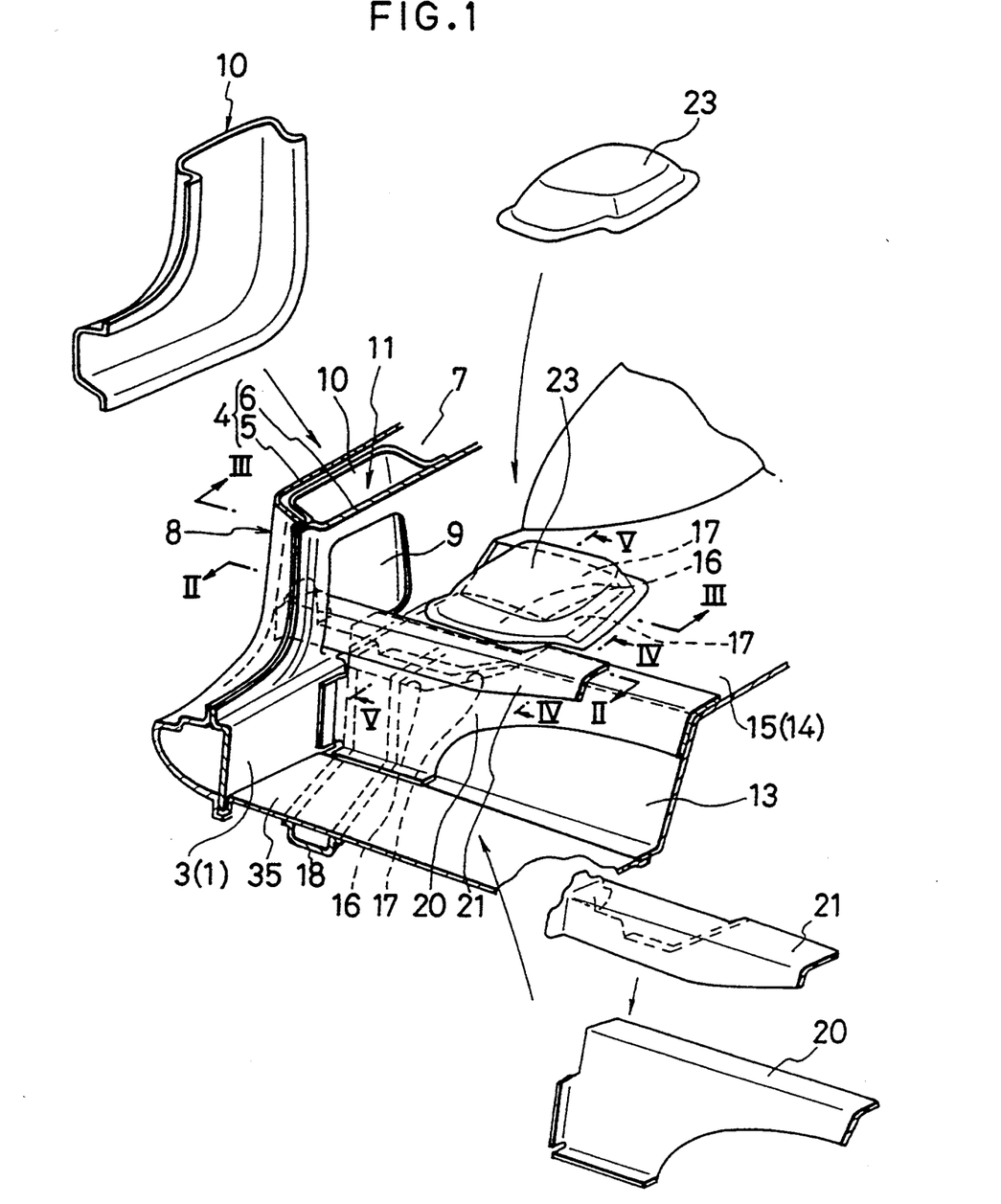
FIG. 1 is a partially sectional, perspective view showing how each of the elements is mounted in an embodiment according to the present invention, when viewed into the inside of the body from the outside in the direction as indicated by the arrow A in FIG. 8.
Figure 2:
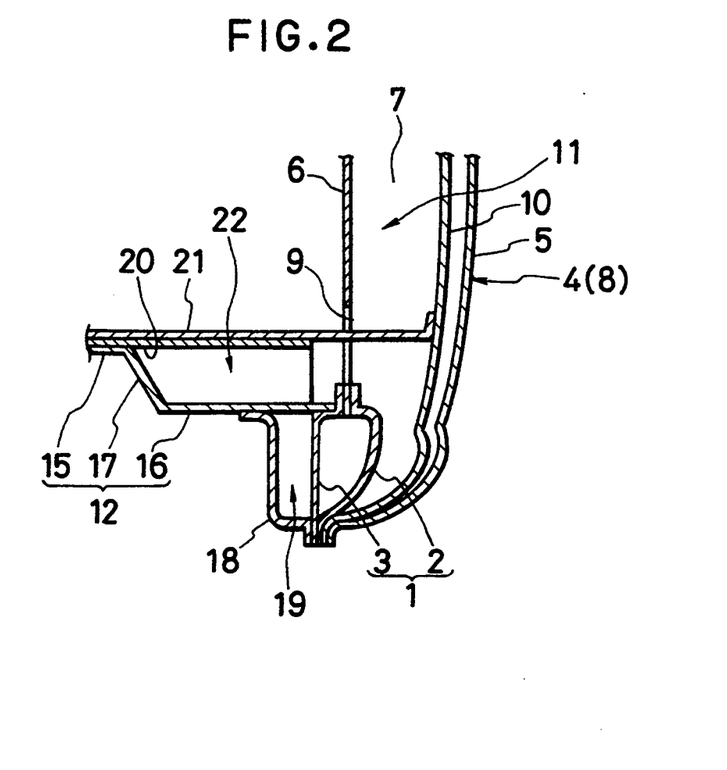
FIG. 2 is a sectional view when taken in line II—II in FIG. 1.
Figure 3:
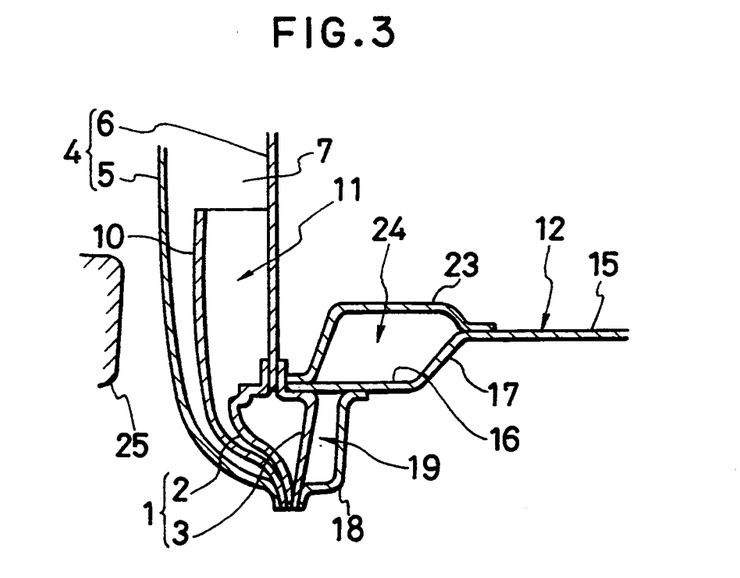
FIG. 3 is a sectional view when taken in line III—III in FIG. 1.

As shown in FIGS. 1 to 3, the side sill 1 is disposed at each of the left and right sides of the body and extends in the longitudinal direction of the body. The structure of the side sill 1 is in a closed structure which is formed with an outer side sill section 2 and an inner side sill section 3, as is known to the art.

At the upper portion of the side sill 1 is disposed the rear fender 4, as shown in FIGS. 1 to 3, which in turn comprises a rear fender outer panel 5 and a rear fender inner panel 6 and which has an inner space 7 formed in association with the rear fender outer panel 5 and the rear fender inner panel 6. Further, the rear fender 4 constitutes part of the center pillar 8. The rear fender outer panel 5 is so disposed as to cover the side sill 1 from the transversely outer side of the body, and an lower end portion of the rear fender outer panel 5 is connected with the lower end portion of the side sill 1. On the other hand, the rear fender inner panel 6 is disposed at the position above the side sill 1, and a lower end portion of the rear fender inner panel 6 is clamped with upper end portions of the side sill outer panel 2 and the side sill inner panel 3. Further, the rear fender inner panel 6 is provided with a through hole 9 above the side sill 1.

As shown in FIGS. 1 to 3, a pillar reinforcement 10 is disposed within the rear fender 4 in a position corresponding to and extending along the center pillar 8. In this embodiment, the pillar reinforcement 10 extends in the longitudinal direction of the body to a larger extent than in conventional cases and is connected with the rear fender inner panel 6 and the side sill 1. This arrangement for the structure forms a closed sectional structure 11 (the first closed section) in association with the pillar reinforcement 10, the rear fender inner panel 6, and the side sill 1. The through hole 9 formed in the rear fender inner panel 6 is disposed facing the inside of the closed sectional structure 11.

More specifically, the pillar reinforcement 10 is generally L-shaped and comprises an upper section extending in a vertical direction of the body along the center pillar 8 and a lower section extending in a longitudinal direction of the body along the side sill 1. Further, the pillar reinforcement 10 is disposed extending downwards over the long length so as to cover the side sill 1 from the outer side of the body, and the lower end portion of the pillar reinforcement 10 is connected with the lower end portion of the side sill 1. The pillar reinforcement 10 may be connected with the side sill 1 by any conventional procedures such as welding, adhesion, fastening with bolts, and so on. In this embodiment, the pillar reinforcement 10 may be welded to the side sill 1. Further, in this embodiment, each of the elements may be connected to the other element by welding.

To the side sill inner panel 3 of the side sill 1 is connected the floor panel 12, as shown in FIGS. 1 to 3. The floor panel 12 comprises a rise section 13 extending and rising along the center pillar 8, a rear floor section 14 extending rearward from an upper end of the rise section 13, and a front floor section 35 extending forwards from a lower end of the rise section 13. The rear floor section 14 is structured flat as a whole and partially lowered at its left and right side end portions to thereby form a stepped section 16. More specifically, the rear floor section 14 comprises a main floor section 15 and the stepped section 16, the main floor section 15 being considerably wide and flat and accounting for a majority of its transversely middle portion and being located in the position higher than the upper end of the side sill 1, and the stepped section 16 being flat and being located in the position as substantially high as the upper face of the side sill 1. Further, the outer side end portion of the stepped section 16 is connected with or welded to the upper end of the side sill 1. At a boundary portion positioned between the main floor section 15 and the stepped section 16 is disposed a sloping section 17, and the space provided underneath the main floor section 15 is so vertically large that a fuel tank (not shown) is disposed in the space. Further, the front floor section 35 is located in the position as substantially high as the lower end of the side sill 1, and an outer side end portion of the front floor section 35 is connected with or welded to the lower end portion of the side sill 1.

Figure 6:
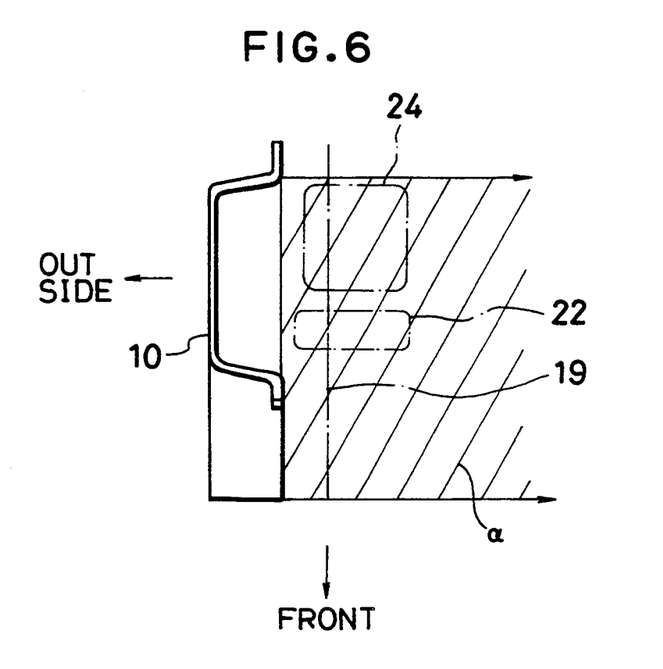
FIG. 6 is a schematic representation showing the relationship of each of the closed sections, when viewed from above the body.
Figure 7:
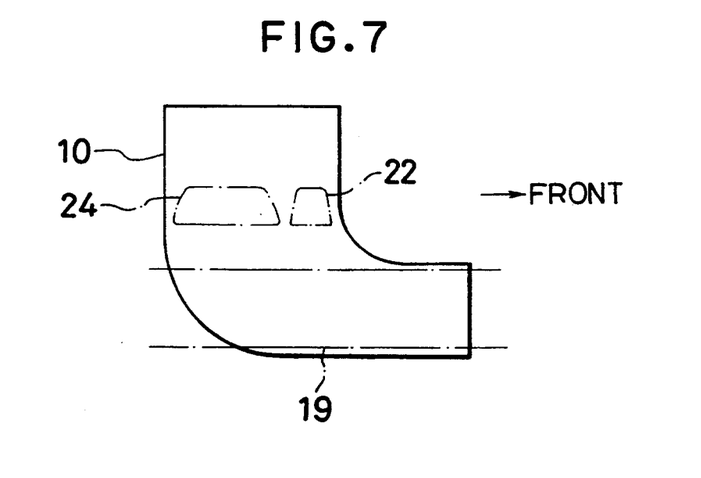
FIG. 7 is a schematic representation showing the relationship of each of the closed sections, when viewed from the left side of FIG. 6.

Further, as shown in FIGS. 1 to 3, a side frame 18 extending in the longitudinal direction of the body is disposed at each of the transversely left and right sides underneath the floor panel 12. More specifically, the side frame 18 is in such a generally U-shaped section as being disposed apart from the side sill 1 in the position before the center pillar 8 and as comprising a bottom wall and left and right side walls. In other words, the side frame 18 forms a closed section in association with the front floor section 35 of the floor panel 12. In addition, the side frame 18 has only the bottom wall and the side wall on the inner side of the body in the position in the vicinity of and rearward of the center pillar 8, thereby forming a closed sectional structure 19 (a second closed section) in association with the side sill inner panel 3 and the stepped section 16 of the floor panel 12. The closed sectional structure 19 is disposed in a position facing a region that is formed when the pillar reinforcement 10 is supposed to extend in the inner direction of the body. More specifically, as shown in FIG. 6, when the closed sectional structure 11 formed with the pillar reinforcement 10 in association with the rear fender inner panel 6 and the side sill 1 is supposed to extend in the inner direction of the body, the region which is formed by extending the closed sectional structure 11 of the pillar reinforcement 10 within the inner side of the body can be indicated by a hatched region a, when viewed from the above, and the closed sectional structure 19 is disposed so as to exist in the position facing the region a. Further, as shown in FIG. 7, the region a corresponds to the locus of the extension of the pillar reinforcement 10 toward the rear side of the paper on which FIG. 7 is drawn. By setting the closed sectional structure 19 so as to be located in the region a, the external force exerted upon the closed sectional structure 11 from the outer side of the body into the inner side thereof can be absorbed because the closed sectional structure 19 exists in the region to which the external force expands.

As shown in FIG. 1, a first floor reinforcement 20 and a second floor reinforcement 21 are disposed on the floor panel 12 in such a manner that they extend over the transversely entire length of the floor panel 12 and over the stepped section 16.

Figure 4:
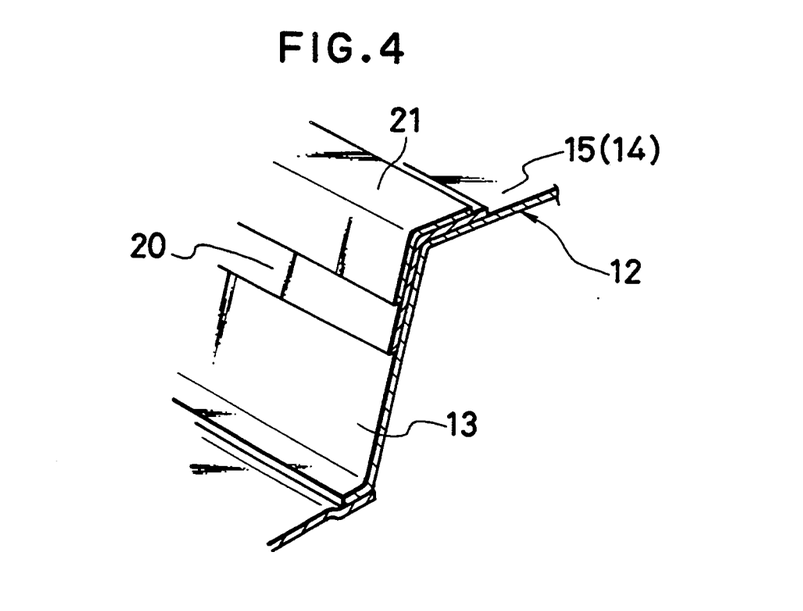
FIG. 4 is a partially sectional, perspective view showing the relationship of the floor reinforcement with the floor panel, when taken in line IV—IV in FIG. 1.
Figure 5:
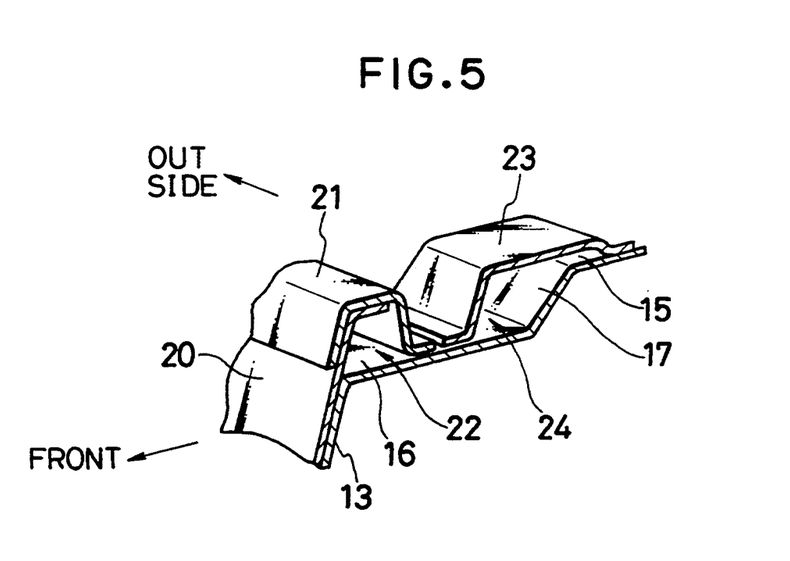
FIG. 5 is a partially sectional, perspective view showing the relationship of the floor reinforcement with the floor panel, when taken in line V—V in FIG. 1.

More specifically, as shown in FIGS. 1, 4, and 5, the first floor reinforcement 20 is disposed so as to extend along the rise section 13 and the main floor section 15. Hence, as shown in FIG. 5, a space is provided between the stepped section 16 and the first floor reinforcement 20, and the vertical length of the space corresponds to the vertical difference between the stepped section 16 and the main floor section 15.

On the other hand, the second floor reinforcement 21 is mounted on the first floor reinforcement 20 and it is disposed only at the boundary portion between the rise section 13 and the rear floor section 14. More specifically, as shown in FIGS. 1 and 4, on the one hand, the second floor reinforcement 21 is connected with or welded to the first floor reinforcement 20 along the first floor reinforcement 20 on the transversely inner side from the stepped section 16 and, as shown in FIGS. 1 and 5, on the other hand, the second floor reinforcement 21 is formed in a generally squared C-letter shape in section and it is disposed so as to cover the first floor reinforcement 20 from the above on the transversely outer side from the stepped section 16. In other words, the second floor reinforcement 21 is connected with or welded to the stepped section 16 and the sloping section 17 and the first floor reinforcement 20 as well. This arrangement for the structure of the stepped section 16 provides a closed sectional structure 22 (a forward third closed section) in association with the first and second floor reinforcements 20 and 21, and the closed sectional structure 22 is disposed so as to extend slenderly in the transverse direction of the body at substantially the same height as the main floor section 15. This closed sectional structure 22 is disposed on the transversely inner side from the closed sectional structure 11 so as to face the region α as shown in FIG. 6. By setting the closed sectional structure 22 in the manner as described hereinabove, the external force exerted upon the closed sectional structure 11 from the outer side of the body into the inner side thereof due to a car side crash can be absorbed because the closed sectional structure 22 exists in the region to which the external force extends.

Further, the second floor reinforcement 21 is disposed so as to extend further from the first floor reinforcement 20 toward the transverse outside of the body. A transversely outer end portion of the second floor reinforcement 21 extends through the through hole 9 to the pillar reinforcement 10 and connected with or welded to an inner face of the pillar reinforcement 10.

As shown in FIGS. 1, 3, and 5, a third floor reinforcement 23 is disposed on the floor panel 12 at the side of the body rearward of the first and second floor reinforcements 20 and 21. The third floor reinforcement 23 is in a generally squared C-shaped cap structure in section having an opening facing downward and it is disposed astride the main floor section 15 and the stepped section 16. The third floor reinforcement 23 forms a third closed sectional structure 24 as a rearward third closed section in association with the floor panel 12. As shown in FIGS. 1 and 3, this closed sectional structure 24 is disposed on the transversely inner side of the body from the closed sectional structure 11 so as to face the region α as shown in FIG. 6. In other words, as the closed sectional structure 24 is located in the region to which external force can be absorbed by the closed sectional structure 24, even if the external force would be imposed upon the closed sectional structure 11 from the outer side of the body into the inner side thereof.

As described hereinabove, the stepped section 16, the first floor reinforcement 20, and the second floor reinforcement 21 form the closed sectional structure 22 located in the position as substantially high as the main floor section 15. Hence, the load entered from the side body of the vehicle due to a car side crash is allowed to disperse with the aid of the stepped section 16 which is offset downward with respect to the main floor section 15, thereby preventing the rear floor section 14 from curving.

Further, the second floor reinforcement 21 is arranged in such a manner that its transversely outer end portion is connected with or welded to the pillar reinforcement 10 through the through hole 9, so that the external load entered from the side body due to the car side crash can be received in the position as remote as possible from the place where the passenger sits, and the body of the vehicle can be caused to be crushed only at the transversely outer side of the body and prevented from being broken at the transversely inner side of the body. Further, the arrangement for the structure of the side body of the vehicle can support the pillar reinforcement 10, thereby preventing the center pillar 8 from being curved and fallen down into the inside of the vehicle.

In addition, the structure of the side body of the vehicle according to the present invention is arranged in such a manner that the closed sectional structures 19, 22, and 24 are disposed in the region facing the region α in which the closed sectional structure 11 is supposed to extend in the transversely inner direction of the body, as shown in FIG. 6, so that, even if a bumper 25 of another car collides with the body of the vehicle, for example, as shown in FIG. 3, the load entered from the side body of the vehicle due to the car side crash is first received by the closed sectional structure 11 and then dispersed into and absorbed by the closed sectional structures 19, 22, and 24. Hence, the arrangement for the structure of the side body of the vehicle according to the present invention can improve physical strength against a side crash of the vehicle. Further, the structure of the side body of the vehicle according to the present invention can effectively prevent the center pillar 8 from being fallen down or collapsed into the inside of the body, particularly in association with the disposition of the second floor reinforcement 21.

The present invention is not intended in any respect to be limited to the embodiments as described hereinabove, and it is to be understood that any variations or modifications made so as not to deviate from the basic concepts of the present invention are interpreted as being encompassed within the spirit of the present invention.

What is claimed is:

1. A structure of a side body of an automotive vehicle having a side sill extending in a longitudinal direction of said side body in a lower position at each of left and right side portions of the body, a floor panel connected at left and right side end sections to said side sill, a rear fender connected at a lower end portion to said side sill, said rear fender comprising a rear fender inner panel and a rear fender outer panel, and a pillar section, said structure comprising:

a first closed section formed by a pillar reinforcement and said rear fender inner panel, said pillar reinforcement disposed in said rear fender to reinforce said pillar section;

at least one second closed section formed by said side sill, a side frame, and said floor panel, said side frame disposed below said floor panel and adjacent to said side sill; and a third closed section formed by a floor reinforcement and said floor panel, said third closed section disposed above said floor panel and above said second closed section;

wherein said second closed section and said third closed section are located in the region of said first closed section and are inside said side body in a region extending transversely from said first closed section toward the inside of said side body.

2. A structure of a side body of a vehicle as claimed in claim 1, wherein said pillar section is disposed to define a rear end of a side opening formed at said side body through which a passenger enters and exits; and said side sill is disposed to define a lower end of said side opening.

3. A structure of a side body of a vehicle as claimed in claim 1, wherein said floor panel comprises a front floor section, a rear floor section, and a rise section, said front floor section is proximately disposed in front of said pillar section and with a front side portion, said rear floor section is proximately disposed behind said pillar section and with its rear side portion raised with respect to said front side portion, and said rise section is disposed in the vicinity of said pillar section and connects said front floor section to said rear floor section.

4. A structure of a side body of a vehicle as claimed in claim 3, wherein said front floor section is attached to a lower end portion of said side sill; and said rear floor section is attached to an upper end portion of said side sill.

5. A structure of a side body of a vehicle as claimed in claim 4, wherein a stepped section is provided at left and right side portions of said rear floor section, said stepped section arranged so as to be partially lowered and said stepped section is attached to said upper end portion of said side kill.

6. A structure of a side body of a vehicle as claimed in claim 5, wherein said floor reinforcement is disposed on said stepped section, thereby forming said third closed section on said stepped section.

7. A structure of a side body of a vehicle as claimed in claim 6, wherein two of said third closed sections are provided in a relationship spaced apart in a longitudinal direction of the body.

8. A structure of a side body of a vehicle as claimed in claim 6, wherein said floor reinforcement is disposed to extend over the transversely entire length of the body, thereby reinforcing a boundary section interposed between said rear floor section and said rise section.

9. A structure of a side body of a vehicle as claimed in claim 8, wherein said floor reinforcement extending in a transverse direction of the body comprises a first floor reinforcement extending to a lower end of said rise section and a second floor reinforcement existing only at the boundary section interposed between said rise section and said rear floor section.

10. A structure of a side body of a vehicle as claimed in claim 9, wherein a transversely outer end portion of said second floor reinforcement is disposed to extend through an aperture in said rear fender inner panel and to abut with said pillar reinforcement; and said second floor reinforcement is attached to said pillar reinforcement.

11. A structure of a side body of a vehicle as claimed in claim 6, wherein said floor reinforcement is structured in a generally squared C-shaped form having an opening facing said stepped section and is connected with said stepped section at an upper surface thereof.

12. A structure of a side body of a vehicle as claimed in claim 7, wherein said two third closed sections comprise a forward third closed section located on the front side of the body and a rearward third closed section located on the rear side of the body, said forward third closed section is formed in association with a first floor reinforcement which extends transversely to reinforce a boundary section interposed between said rear floor section and said rise section and said rearward third closed section is formed in association with a second floor reinforcement which is connected to an upper surface of said stepped section and having a generally squared C-shaped form with an opening facing below.

13. A structure of a side body of a vehicle as claimed in claim 1, wherein said floor reinforcement extends in a transverse direction of the body; and said third closed section extends in the transverse direction of the body.

14. A structure of a side body of a vehicle as claimed in claim 1, wherein said floor reinforcement is arranged in a generally squared C-shaped form having an opening facing below; and said third closed section is in a form corresponding to said floor reinforcement.

15. A structure of a side body of a vehicle as claimed in claim 1, wherein said floor reinforcement comprises two kinds of floor reinforcements disposed spaced apart in a longitudinal direction of the body; and said third closed section is formed by said two kinds of floor reinforcements, said two kinds of floor reinforcements comprise a forward third closed section located at a front side of the body and a rearward third closed section located at a rear side of the body.

16. A structure of a side body of a vehicle as claimed in claim 1, wherein a front portion of said side frame extends in a longitudinal direction of said body so that said front portion of said side frame is separated from said side sill in the vicinity of said pillar section and a rear portion of said side frame forms said second closed section with said side sill and said floor panel.

17. A structure of a side body of a vehicle as claimed in claim 16, wherein said front portion of said side frame, separated from said side sill, is shaped in a generally U-letter form, in section, has an opening facing upwards, a bottom portion, and two side wall portions, and forms another second closed section with said floor panel; and a rear portion of said side frame having a bottom portion and one side wall portion on said inner side of the vehicle body and forms said second closed section with said side sill and said floor panel.

18. A structure of a side body of a vehicle as claimed in claim 8, wherein a transversely outer end portion of said floor reinforcement extends through an aperture in said rear fender inner panel to said pillar reinforcement and said outer end portion is attached to said pillar reinforcement.

19. A structure of a side body of a vehicle as claimed in claim 18, wherein said floor reinforcement is as tall as a middle portion of said rear floor section, except for said stepped section of said rear floor section.

20. A structure of a side body of a vehicle as claimed in claim 1, wherein said rear fender inner panel is attached to an upper end portion of said side sill; and said rear fender outer panel is attached to a lower end portion of said side sill.

21. A structure of a side body of a vehicle as claimed in claim 20, wherein said pillar reinforcement extends to a lower position to cover said side sill from an outer side of the body and a lower end portion of said pillar reinforcement is attached to a lower end portion of said side sill.

22. A structure of a side body of a vehicle as claimed in claim 21, wherein said rear fender outer panel extends to a lower position to cover said side sill and said pillar reinforcement from an outer side of the body and a lower end portion of said rear fender outer panel is attached to a lower end portion of said side sill.

23. A structure of a side body of a vehicle as claimed in claim 1, wherein said pillar reinforcement has a generally L-shaped form, and is disposed to extend substantially along the entire length of said pillar section in a vertical direction of said body and said side sill extends in a longitudinal direction of the body.

* * * * *